United States Patent [19]

Bacardit

[11] Patent Number: 5,314,163
[45] Date of Patent: May 24, 1994

[54] ELECTROMAGNETIC VALVE

[75] Inventor: Juan S. Bacardit, Barcelona, Spain

[73] Assignee: Bendix Espana, Barcelona, Spain

[21] Appl. No.: 754,796

[22] Filed: Sep. 4, 1991

Related U.S. Application Data

[63] Continuation of Ser. No. 543,625, Jun. 26, 1990, abandoned.

[30] Foreign Application Priority Data

Aug. 7, 1989 [ES] Spain .................... 89 02801

[51] Int. Cl.$^5$ .................... F16K 31/02; F16K 39/02
[52] U.S. Cl. .................... 251/129.07; 251/129.08; 251/333
[58] Field of Search .............. 251/122, 129.07, 129.08, 251/129.15, 333; 137/550

[56] References Cited

U.S. PATENT DOCUMENTS

| | | | |
|---|---|---|---|
| 1,970,726 | 8/1934 | Barrett | 251/122 |
| 2,403,751 | 7/1946 | Palmer | 251/122 X |
| 3,664,369 | 5/1972 | Johnson | 137/550 X |
| 3,684,238 | 8/1972 | Michellone et al. | 251/129.07 |
| 4,417,601 | 11/1983 | Bennett | 251/122 X |
| 4,543,983 | 10/1985 | Pauliukonis | 137/550 X |
| 4,595,170 | 6/1986 | Livet | 251/129.07 X |
| 4,647,008 | 3/1987 | Shirai et al. | 251/129.07 |
| 4,651,971 | 3/1987 | Donahue, Jr. | 137/550 X |

*Primary Examiner*—John Rivell
*Attorney, Agent, or Firm*—Ken C. Decker; Larry J. Palguta

[57] ABSTRACT

An electromagnetic valve for controlling a passage for a flow of fluid or for a difference in the pressures between an inlet (48;56) and an outlet (56;48), comprises a body (10;16;46) on which is arranged a solenoid coil (22), a bore (26) in which is slideably mounted valve member (30) progressively displaceable in response to actuation of the solenoid coil (22) between a first position and a second position. The valve member (30) and the body (46) comprises cooperating valve surfaces (54;62) defining the passage. One valve surface (62) has in axial section a variable profile so that the area of the passage, in a radial section is a predetermined function of the intensity of the current applied to the solenoid coil (22).

10 Claims, 3 Drawing Sheets

ELECTROMAGNETIC VALVE

This is a continuation of copending application(s) Ser. No. 07/543,625 filed on Jun. 26, 1990 now abandoned.

BACKGROUND OF THE INVENTION

The present invention relates to an electromagnetic valve and, more particularly, to such a valve for use in controlling the flow of fluid in a hydraulic circuit. Such valves may be used with a wide range of hydraulic circuits, especially in the automotive field, but the present invention is of special interest for use in shock absorbers of the adaptative type and in power steering systems.

As a general rule, previously proposed electromagnetic valves, for example that described in U.S. Pat. No. 2,392,741, comprise a generally conical obturating member which is adapted to open or close a circular fluid passage under the action of a solenoid. Such a valve offers minimal control of the fluid flow through the opening, the fluid passage being either open or close.

SUMMARY OF THE INVENTION

It is therefore an object of the present invention to provide an electromagnetic valve of simple construction, which is reliable and in which the flow of fluid through the valve is a function of the current applied to the solenoid.

It is further object of the invention to provide such a valve in which the relationship between fluid pressure through the valve and the current applied to the solenoid is a predetermined function, for example a linear one, a continuously increasing one or a continuously decreasing one.

According to one aspect to the invention there is provided an electromagnetic valve for controlling a passage for a fluid between an inlet and an outlet, the valve comprising a body on which is arranged a solenoid coil, a bore in which is slideably mounted a valve member progressively displaceable in response to actuation of the solenoid coil between a first position and a second position, the valve member and the body comprising cooperating valve surfaces characterized in that one valve surface has in axial section a variable profile so that the area of the passage in a radial section is a predetermined function of the intensity of the current applied to the solenoid coil.

BRIEF DESCRIPTION OF THE DRAWINGS

The invention will now be described, by way of example, with reference to the accompanying drawings, in which.

DETAILED DESCRIPTION OF THE INVENTION

Figure 1:
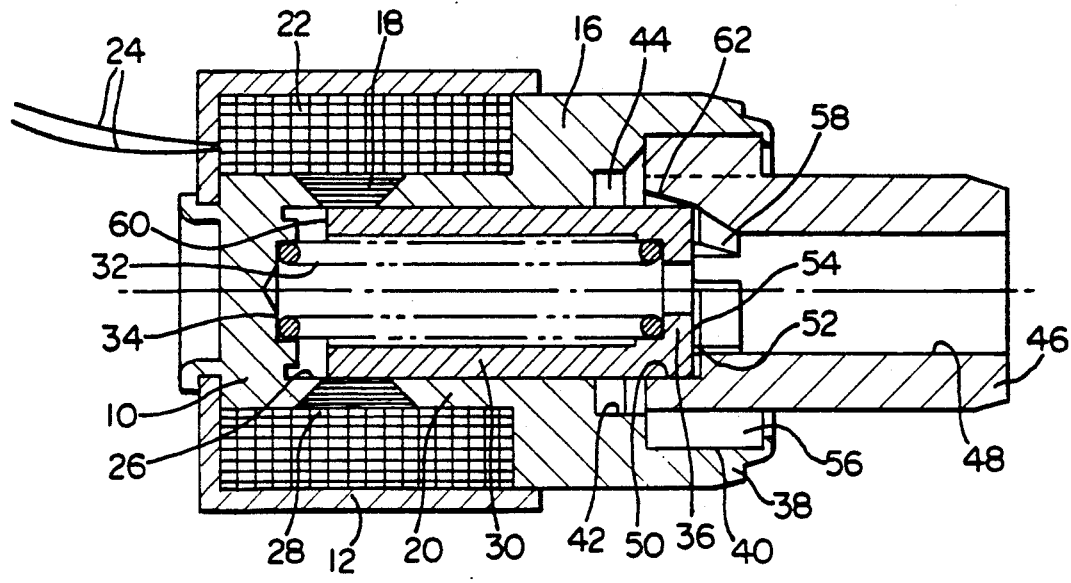
FIG. 1 is a longitudinal section view through a first embodiment of an electromagnetic valve in accordance with the invention.

The electromagnetic valve shown in FIG. 1 comprises a first core part 10. The valve further comprises a second core part 16 which is joined to the first core part 10 by a ring 18 of nonmagnetic material, for example bronze. The first and second core parts 10 and 16 together define a generally cylindrical middle portion 20 around which is fitted a generally cylindrical solenoid coil 22 which is provided with a length of electrical wire 24 for connecting the coil 22 to an electrical source (not shown). A cover 12 may be provided around the coil 22 in order to close the magnetic field. Within the first and second core parts 10 and 16 is formed an axial blind bore 26. The inner diameter of the wall 28 of the ring 18 is similar to that of the bore 26.

A tubular or cylindrical valve member 30 of magnetic material is slideably mounted in the bore 26 and is urged towards the open end of the bore 26 by a helical spring 32, one end of which is received in a recess 34 formed in the end of bore 26, the other end abutting an annular shoulder 36 formed on the inner surface of the tubular valve member 30.

The second core part 16 has an end region 38 of enlarged diameter in which is formed a threaded opening 40 which leads to an annular bore 42. An annular chamber 44 is defined between the annular bore 42 and the valve member 30. A closure member 46 is located in the threaded opening 40 and is formed with an axial, stepped bore 48. A part 50 of the stepped bore 48 has a diameter equal to that of bore 26 and slideably receives an end of the cylindrical valve member 30. A radial shoulder 52 formed in the stepped bore 48 serves as an abutment stop for a radial end surface 54 on the valve member 30. Thus, the valve member 30 is urged by the spring 32 into its illustrated rest position in abutment against the radial shoulder 52. The annular chamber 44 communicates with a passage 56 formed in the closure member 46 which, in use, communicates with a first reservoir of fluid (not shown). Similarly, in use, the bore 48 is in communication with a second source of fluid (not shown). The bore 48 is formed with a number of chamfered passages 58 which open into the radial shoulder 52.

In the illustrated rest position of the valve, an end 60 of the cylindrical valve member 30 is immediately adjacent to the edge between the first core part 10 and the wall 28 of the ring 18. When an electric current is applied to the solenoid coil 22, an electromagnetic field is created which draws the valve member 30 back against the force of spring 32 so opening the fluid passage between the bore 48 and passage 56. Fluid then flows in a direction depending on the pressure difference between the first and second fluid reservoirs.

In accordance with the invention the electromagnetic valve further comprises a restricted fluid passageway in the path between the fluid reservoirs formed by bore 48 and passage 56 whose shape is such, as will be described below, that the pressure of fluid passing through the valve is directly a function of the intensity of the current applied to the solenoid coil 22.

Figure 2:
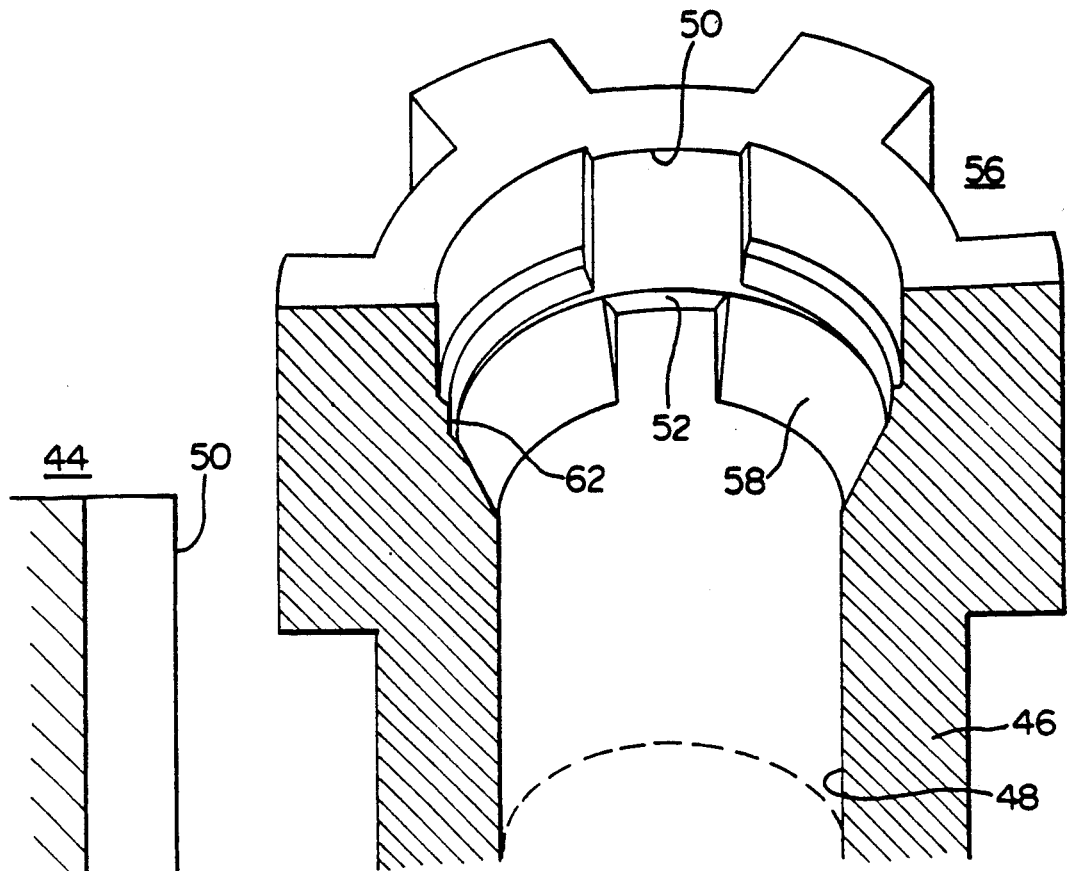
FIG. 2 is an enlarged partial perspective view of a part of the valve of FIG. 1.
Figure 3:
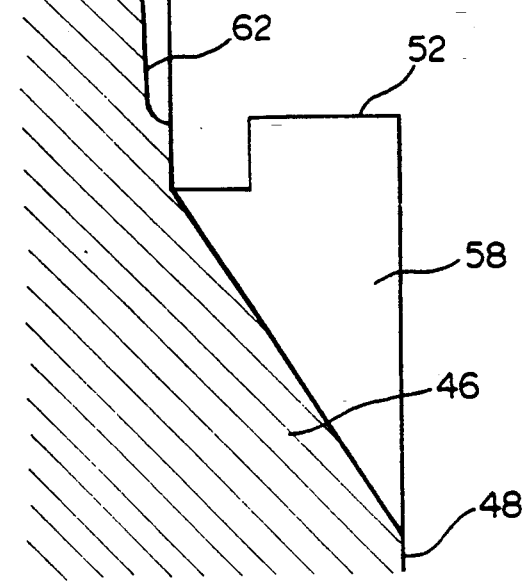
FIG. 3 is an enlarged view of FIG. 2.

As more clearly seen in FIGS. 2 and 3, the closure member 46 has a curved throttling surface 62 which extends from the end of each of the chamfered passages 58 towards the chamber 44.

The throttling surface 62 is arranged over at least a part of an annular region surrounding the valve member 30. The profile of the throttling surface is variable in axial section according to the wished function between the current applied to the solenoid coil 22 and the fluid pressure, and is determined as described as follows with reference to FIG. 4.

Under the normal working conditions, the force F exerted by the solenoid coil 22 on the valve member 30 is a linear function of the intensity I supplied to the solenoid coil 22, according to the graph of the quadrant I. In the same conditions, this force F exerted by the valve member 30 on the spring 32 will produce a displacement D of the valve member 30 which is a linear function of this force F, according to the graph of the quadrant II.

When the desired function between the fluid pressure through the valve and the current applied to the solenoid coil is known, then the axis of intensities can be graduated also in pressure units, and a section S against pressure P characteristics can be set out in the quadrant III.

It is then possible to determine, in quadrant IV, the displacement D (of the valve member 30) against section S (in a radial section of the throttle) characteristics, by means of which the pressure P through the valve will correspond exactly to the one wanted when applying a predetermined current to the solenoid coil, the profile of the throttling surface 62, which gives this result being determined by the shape of the curve in the quadrant IV.

Figure 5:
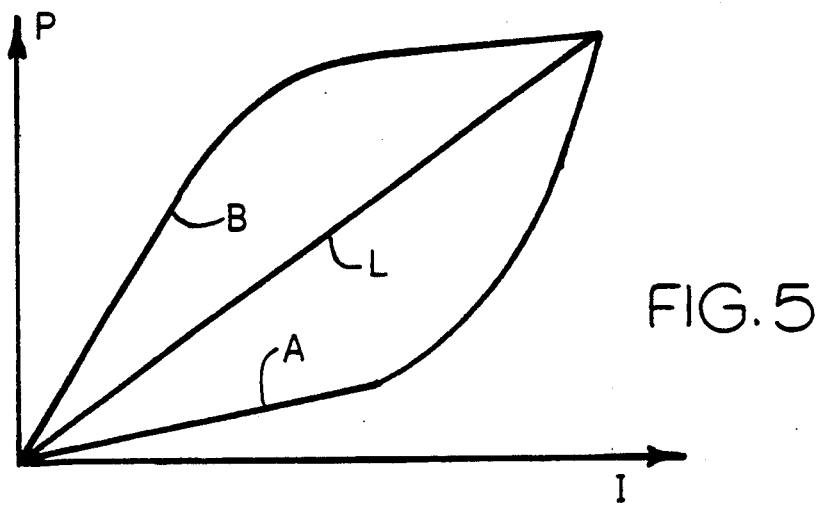
FIG. 5 is a pressure against intensity characteristics.

According to the invention, it is possible to obtain an electromagnetic valve through which the pressure is a predetermined function of the current applied to the solenoid coil, as illustrated in FIG. 5. The pressure through the valve may he a linear function of the intensity (curve L), it may also vary very progressively in the low pressure area (curve A) or in the high pressure area (curve B).

Figure 4:
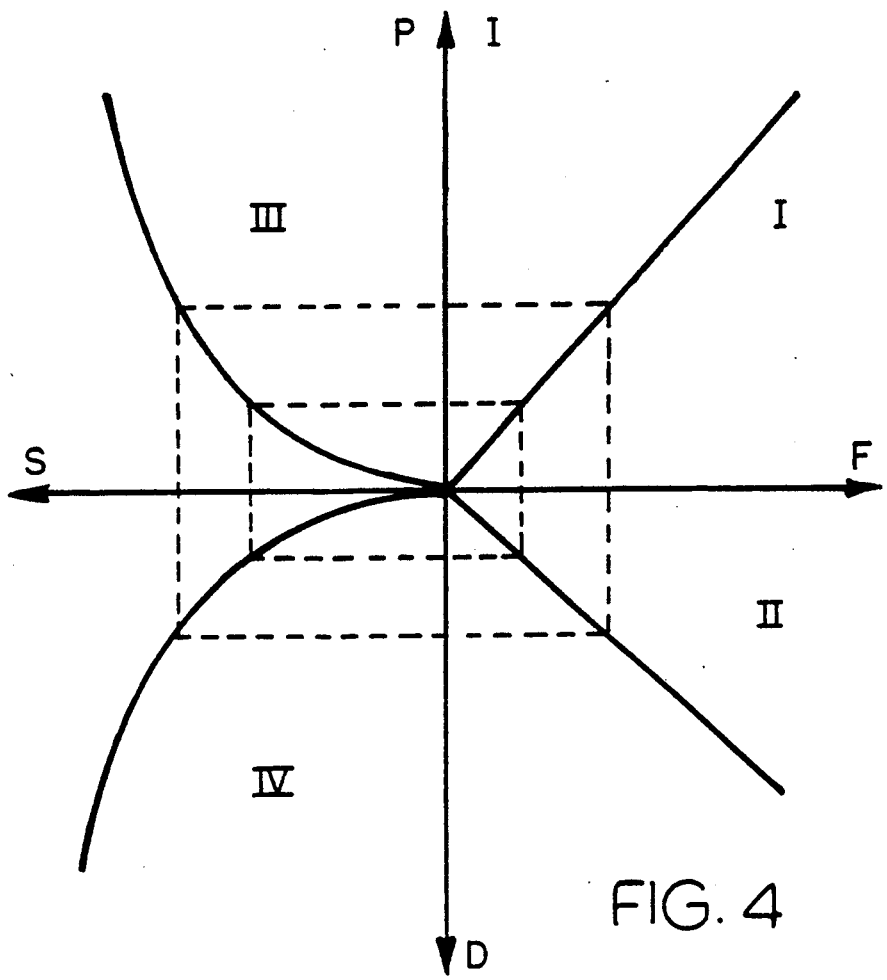
FIG. 4 is a diagram illustrating the design of the throttling surface of the valve.

For example, if this predetermined function is linear, the profile of the throttling surface 62 has to be parabolic, as shown by the curve in the quadrant VI of FIG. 4.

The electromagnetic valve described with reference to FIG. 1 is normally closed. It will be understood that the invention finds its application as well in normally open electromagnetic valves.

Figure 6:
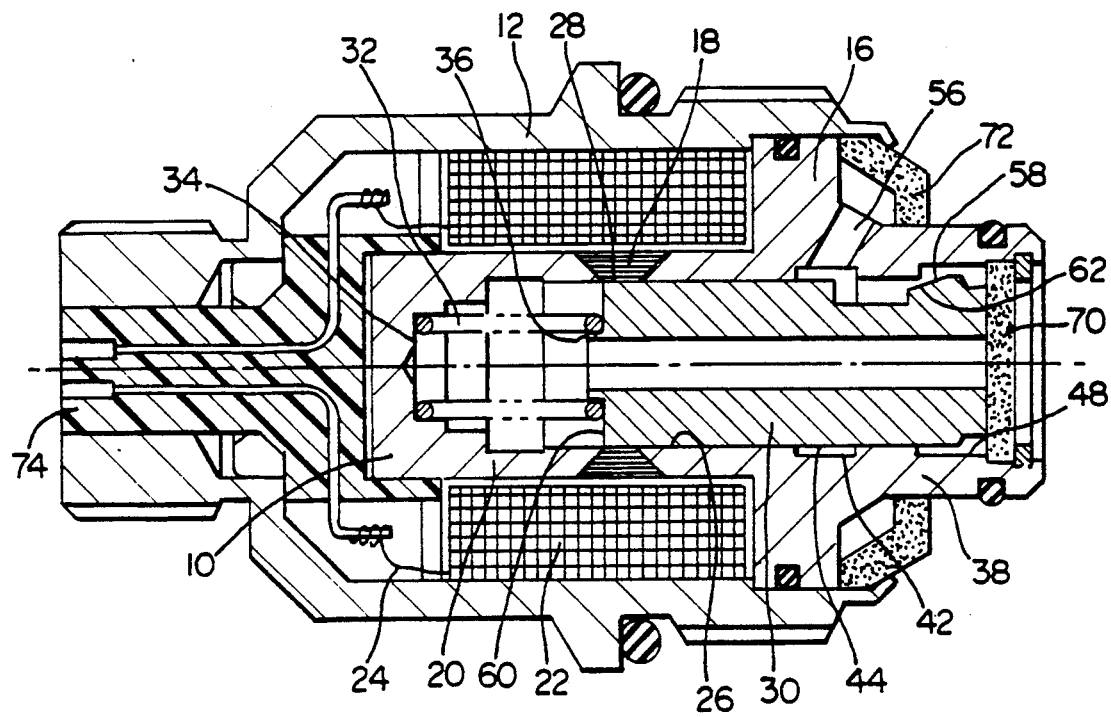
FIG. 6 is a longitudinal section view through a second embodiment of an electromagnetic valve according to the invention.

FIG. 6 describes such a valve, in which same components are referenced by the same numerals. This valve will not receive a detailed description since it is very similar to that described by reference to FIG. 1. The main difference lies in the fact that the throttling surface 62 is formed directly on the valve member 30, over at least a part of an annular region surrounding the valve member 30 in order to achieve the functionning of a normally open electromagnetic valve.

Additionnally, this valve includes a filter 70 at the end of the bore 48, and a filter 72 at the end of the passage 56, in order to prevent contamination of the valve and the throttle by dust or metallic particles which may eventually be present in the hydraulic fluid, and which could create a misfunctionning of the electromagnetic valve.

The valve includes also an electric connector 74 for an easy connection of the valve to an electrical source.

It will be understood that the filters 70 and 72, and the electric connector 74 could as well be parts of the electromagnetic valve described by reference to FIG. 1.

The electromagnetic valve in accordance with the invention will be of particular use in controlling fluid flow in hydraulic assemblies such as adaptative shock absorbers and in power steering systems. The electrical control circuit required by the valve is therefore minimized.

While only two embodiments of the invention have been shown and described, various modifications and changes may be brought by the skilled man without departing from the scope of the invention as defined in the joined claims. For example, in order to improve the response time of the valve, the valve member may be made from an amorphous metal alloy.

What we claim is:

1. An electromagnetic valve for controlling a restricted fluid passage for flow of fluid or for controlling the difference in pressure between the inlet and an outlet of the valve, said valve comprising a body, a solenoid coil mounted on said body, said body defining a bore and a radially extending shoulder on said bore, generally tubular valve member slidably mounted in said bore and having a radially projecting end surface for engagement with said shoulder, said valve member being progressively displaceable within said bore in response to actuation of the solenoid coil between a first position when said end surface is engaged with the shoulder and a second position, said end surface being engaged with said shoulder when the valve member is in one of said first and second positions, said valve member being maintainable in one or more predetermined positions between said first and second positions by applying and holding an electrical current of a predetermined intensity corresponding to each other predetermined positions between the first and second positions to said solenoid coil, the valve member having a circumferentially extending throttling surface cooperating with a circumferentially extending throttling surface on said bore, one of said throttling surface having a length extending parallel to the axis of said bore, the distance between said throttling surfaces defining the restricted passage, said one throttling surface having a contour which varies non-linearly in the radial direction along he length of the throttling surface on the bore, said throttling surface on said valve member cooperating with the throttling surface on the bore so that the area of the restricted passage defined between said throttling surfaces varies non-linearly as said valve member is moved away from said first position to any of said positions between the first and second position so that the area of said restricted passage is a predetermined function of the intensity of the current applied to the solenoid coil, the difference in the pressures between the inlet and the outlet being a linear function of the intensity of the current applied to the solenoid coil.

2. The valve according to claim 1 wherein said one throttling surface has in axial section a parabolic profile.

3. The valve according to claim 1, wherein the difference in the pressures between the inlet and the outlet being a direct function of the intensity of the current applied to the solenoid coil.

4. The valve according to claim 1, wherein the difference in the pressures between the inlet and the outlet an inverse function of the intensity of the current applied to the solenoid coil.

5. The valve according to claim 1, wherein the one throttling surface is formed on the body.

6. The valve according to claim 1, wherein in the first position, the valve is closed.

7. The valve according to claim 1, wherein the one throttling surface is formed on the valve member.

8. The valve according to claim 7, wherein the first position, the valve is opened.

9. The valve according to claim 1, wherein in the first position, the valve is closed.

10. The valve according to claim 1, wherein the valve member is made of an amorphous metal alloy.

* * * * *